Figure 1:
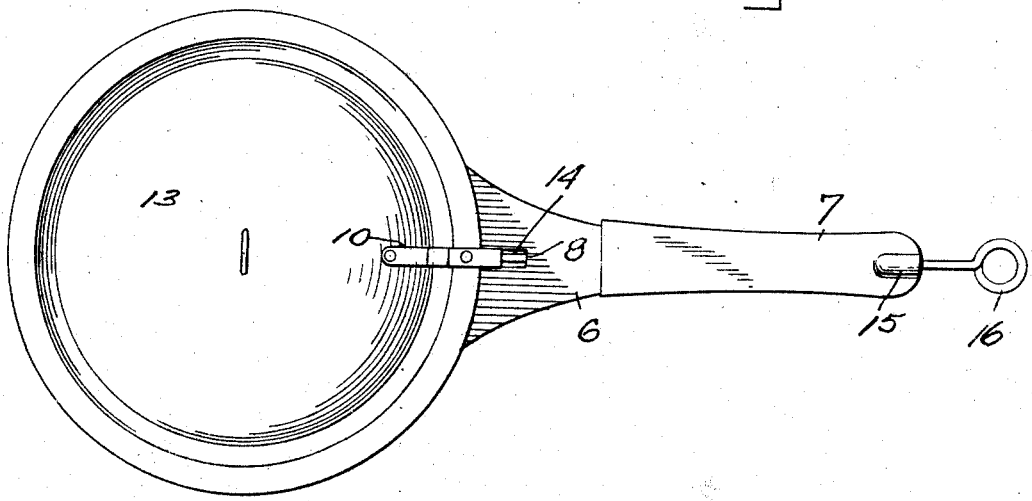

C. M. HILL & E. P. ZAHNTER.
COOKING UTENSIL.
APPLICATION FILED JULY 22, 1907.

928,383.

Patented July 20, 1909.
2 SHEETS—SHEET 1.

Witnesses
G. R. Thomas
F. G. Smith

Inventors
Claudius M. Hill
Ervie P. Zahnter
By
Attorneys

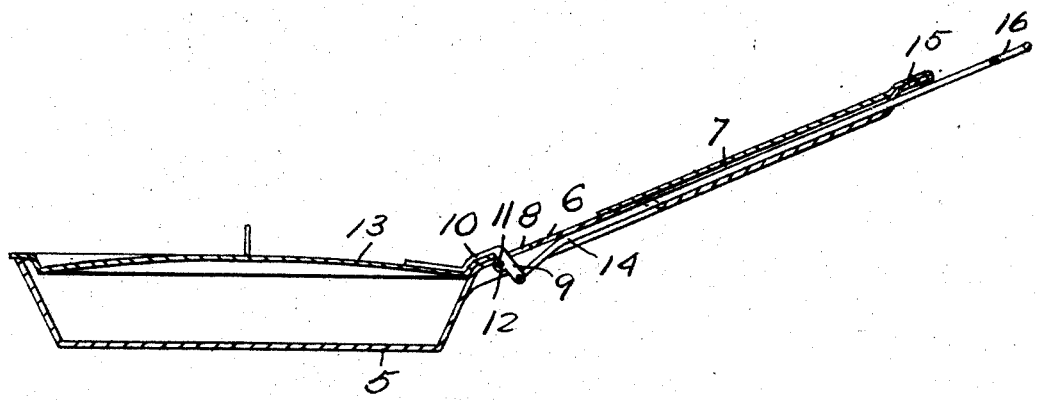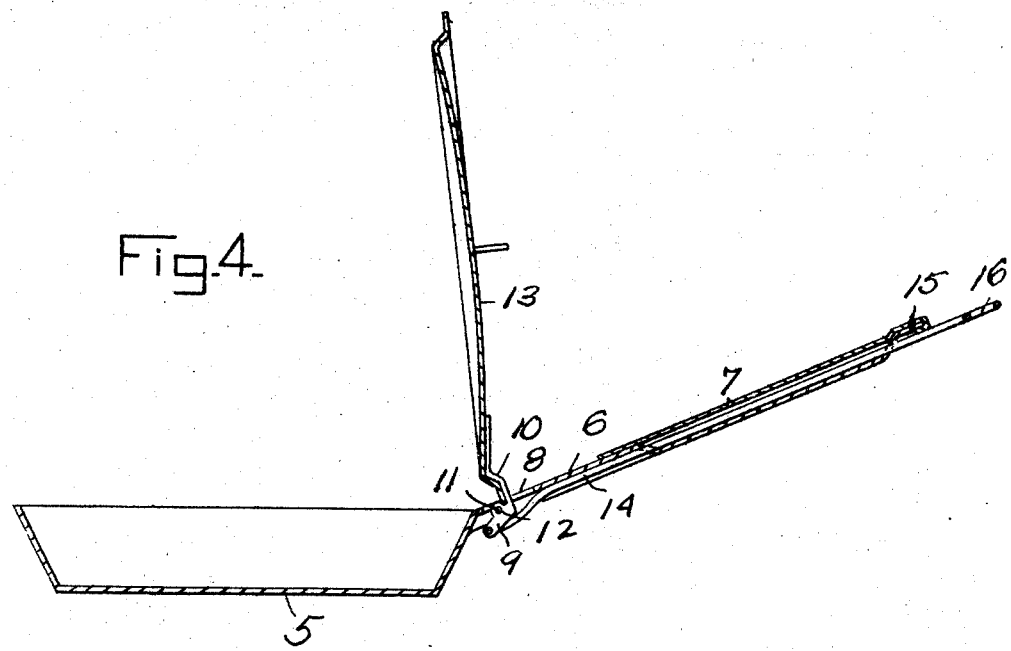

UNITED STATES PATENT OFFICE.

CLAUDIUS M. HILL AND ERVIE P. ZAHNTER, OF HIGHLAND, CALIFORNIA.

COOKING UTENSIL.

No. 928,383.      Specification of Letters Patent.      Patented July 20, 1909.

Application filed July 22, 1907. Serial No. 384,895.

*To all whom it may concern:*

Be it known that we, CLAUDIUS M. HILL and ERVIE P. ZAHNTER, citizens of the United States, residing at Highland, in the county of San Bernardino, State of California, have invented certain new and useful Improvements in Cooking Utensils; and we do hereby declare the following to be a full, clear, and exact description of the invention, such as will enable others skilled in the art to which it appertains to make and use the same.

This invention relates to cooking utensils and more particularly to that class which are provided with hinged covers, the primary object of the invention being to provide a utensil having a cover hinged thereto and a means, working in the handle of the utensil whereby the cover may be swung upon its hinge.

In the drawings the invention is shown as employed in conjunction with a skillet but it is to be understood that we are not to be limited to this application of the invention but may employ the same in conjunction with any other form of cooking utensil, such for example as saucepans, and the like.

Figure 2:
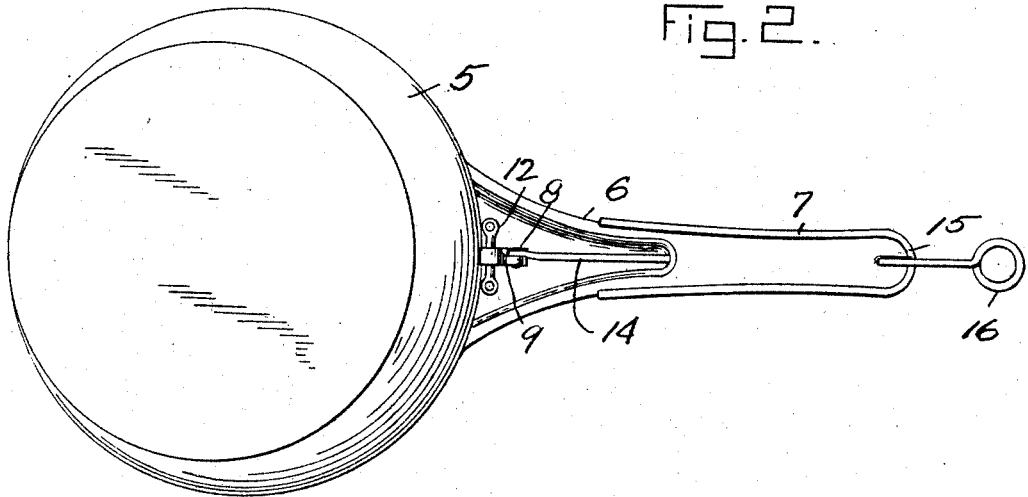

In the accompanying drawings, Figure 1 is a top plan view of a skillet showing the application of our invention thereto, Fig. 2 is a bottom plan view of the skillet, Fig. 3 is a vertical longitudinal sectional view through the skillet showing the position of parts when the cover is closed, and, Fig. 4 is a similar view showing the position of the parts when the cover is raised.

In the drawings, the numeral 5 denotes the body of a skillet and 6 the handle thereof, the said handle being provided with the sleeve or cover 7 now found upon handles of cooking utensils.

In carrying out our invention we form in the handle adjacent its point of junction with the body a slot 8 and working in the slot is an angle lever including arms 9 and 10, the angle lever being provided at the junction of its arms with an opening 11 through which is passed a pivot pin 12 which is riveted or otherwise secured to the under side of the said handle, the arm 9 being shown as extended beneath the handle and the arm 10 above the handle. The cover for the skillet is indicated by the numeral 13 and this cover is carried or supported by the arm 10 of the angle lever, a rod 14 being pivotally connected at its forward end to the outer end of the arm 9 of the angle lever.

The rod 14 mentioned above is extended between the handle and the cover 7 thereof as is clearly shown and is slidable between these two elements, the extreme end of the handle being stamped up as at 15 to permit such passage of the rod. At its extreme outer end, the rod is bent to form an eye 16 which forms a finger hold and also permit the skillet to be hung upon the wall and to maintain the cover closed on the skillet when in such position.

From the foregoing description of our invention and from the drawings it will be observed that when the rod 14 is extended, the cover is lowered into position to close the body 5 of the skillet but that when the rod is pushed forwardly by grasping its eye end 16, the angle lever will be rocked so as to swing the cover upwardly and permit the contents of the skillet to be removed or to permit food to be placed therein.

It has been found of great advantage to have the angle lever extend through the slot as this arrangement permits the arm 9 to contact with the body 5 and thereby limit the upward movement of the cover 13. This prevents the cover from falling back on the handle 6, a feature which is to be greatly appreciated. In order that this contact of the arm 9 with the body 5 may be assured, it is to be noted that the pivot pin 12, is arranged on a plane slightly beneath the plane of the opening 8.

What is claimed, is—

In a cooking utensil, the combination of a body, a handle projecting from the latter and containing an opening contiguous with said body, a cover hinged in said opening to permit the opening and closing thereof and having an extension projecting below the handle, and a slidable rod mounted in the handle below the same and pivotally connected to the said extension whereby the cover may be raised and lowered.

In testimony whereof, we affix our signatures, in presence of two witnesses.

CLAUDIUS M. HILL.
              ERVIE P. ZAHNTER.

Witnesses:
  JOHN A. WARD,
  M. M. RANDALL.